US010816387B2

(12) United States Patent
Fournier et al.

(10) Patent No.: US 10,816,387 B2
(45) Date of Patent: Oct. 27, 2020

(54) REGRESSION-BASED ANIMAL WEIGHT ESTIMATION

(71) Applicant: The GSI Group, LLC, Assumption, IL (US)

(72) Inventors: Vincent Fournier, St-Hubert (CA); Benoit R. Laberge, St-Hubert (CA); Yvon Gaudreau, St-Hubert (CA); Nicolas Bégin, Saint-Jean sur Richelieu (CA); Adam A. Weiss, Forsyth, IL (US)

(73) Assignee: The GSI Group LLC, Assumption, IL (US)

(*) Notice: Subject to any disclaimer, the term of this patent is extended or adjusted under 35 U.S.C. 154(b) by 0 days.

(21) Appl. No.: 16/627,189

(22) PCT Filed: Jun. 13, 2018

(86) PCT No.: PCT/IB2018/054285
§ 371 (c)(1),
(2) Date: Dec. 27, 2019

(87) PCT Pub. No.: WO2019/003015
PCT Pub. Date: Jan. 3, 2019

(65) Prior Publication Data
US 2020/0225076 A1 Jul. 16, 2020

Related U.S. Application Data

(60) Provisional application No. 62/526,465, filed on Jun. 29, 2017.

(51) Int. Cl.
*G06T 7/00* (2017.01)
*G01G 17/08* (2006.01)
(Continued)

(52) U.S. Cl.
CPC ............. *G01G 17/08* (2013.01); *G01G 9/005* (2013.01); *G06T 7/564* (2017.01); *G06T 7/62* (2017.01);
(Continued)

(58) Field of Classification Search
CPC ............... A01K 5/00; G06T 7/00; G06K 9/00
(Continued)

(56) References Cited

U.S. PATENT DOCUMENTS 8,351,656 B2 1/2013 Spicola et al.
8,755,570 B2 6/2014 Gomas et al.
(Continued)

FOREIGN PATENT DOCUMENTS

DE 10058691 A1 6/2002
EP 2698763 A1 2/2014
(Continued)

OTHER PUBLICATIONS

UK Intellectual Propert Office, Search Report for UK priority application No. GB 1711123.8, dated Dec. 12, 2017.
(Continued)

*Primary Examiner* — Abolfazl Tabatabai

(57) ABSTRACT

In one embodiment, a method executed by a computing system, comprising: receiving pixel samples from three-dimensional (3D) data corresponding to one or more images comprising one or more animals; fitting curves for the received pixel samples; deriving parameters from the curves; determining measurements based on variations in the parameters; and estimating a weight of the one or more animals by applying one or more regression algorithms to the measurements.

20 Claims, 7 Drawing Sheets

(51) Int. Cl.
  *G06T 7/64* (2017.01)
  *G06T 7/62* (2017.01)
  *G01G 9/00* (2006.01)
  *G06T 7/564* (2017.01)
  *A01K 1/08* (2006.01)

(52) U.S. Cl.
  CPC ...... *G06T 7/64* (2017.01); *G06T 2207/10012* (2013.01); *G06T 2207/10028* (2013.01)

(58) Field of Classification Search
  USPC ........................................................ 382/106
  See application file for complete search history.

(56) References Cited

U.S. PATENT DOCUMENTS

| | | | | |
|---|---|---|---|---|
| 8,787,621 B2 * | 7/2014 | Spicola, Sr. | ............ | G01G 9/00 382/110 |
| 8,878,621 B2 | 11/2014 | Sazo et al. | | |
| 9,142,028 B2 * | 9/2015 | Banhazi | .................... | G06T 7/60 |
| 2010/0289879 A1 | 11/2010 | Sinzinger et al. | | |
| 2016/0012278 A1 | 1/2016 | Banhazi et al. | | |

FOREIGN PATENT DOCUMENTS

| | | |
|---|---|---|
| JP | 2014044078 A | 3/2014 |
| KR | 20130065896 A | 6/2013 |
| WO | 2010/127277 A2 | 11/2010 |
| WO | 2017/030448 A1 | 2/2017 |

OTHER PUBLICATIONS

European Patent Office, International Search Report for related International Application No. PCT/IB2018/054285, dated Sep. 12, 2018.
Mortensen Anders Krogh et al: "Weight prediction of broiler chickens using 3D computer vision", Computers and Electronics in Agriculture, Elsevier, Amsterdam, NL, vol. 123, Mar. 17, 2016 (Mar. 17, 2016), pp. 319-326, XP029491936, ISSN: 0168-1699.

* cited by examiner and# REGRESSION-BASED ANIMAL WEIGHT ESTIMATION

TECHNICAL FIELD

The present disclosure is generally related to livestock production and management.

BACKGROUND

Livestock production and management is generally concerned with production of animal products, animal care, and consumption and/or use of animal products and associated services for livestock-related agribusiness. Some animal metrics, including animal weight, are used to analyze animal health, monitor animal development, and determine or estimate yield. For instance, various mechanisms have been devised to determine or estimate the weight of an animal, including mechanically via the use of weight scales on the floor of a pen, by imaging of the animal and analysis of an extracted contour boundary and demographic information about the animal to estimate weight, and imaging of the animal for comparison to a model for weight estimation. However, there is still room for advancements in weight estimation.

BRIEF DESCRIPTION OF THE DRAWINGS

Many aspects of certain embodiments of the disclosure can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

Figure 1:
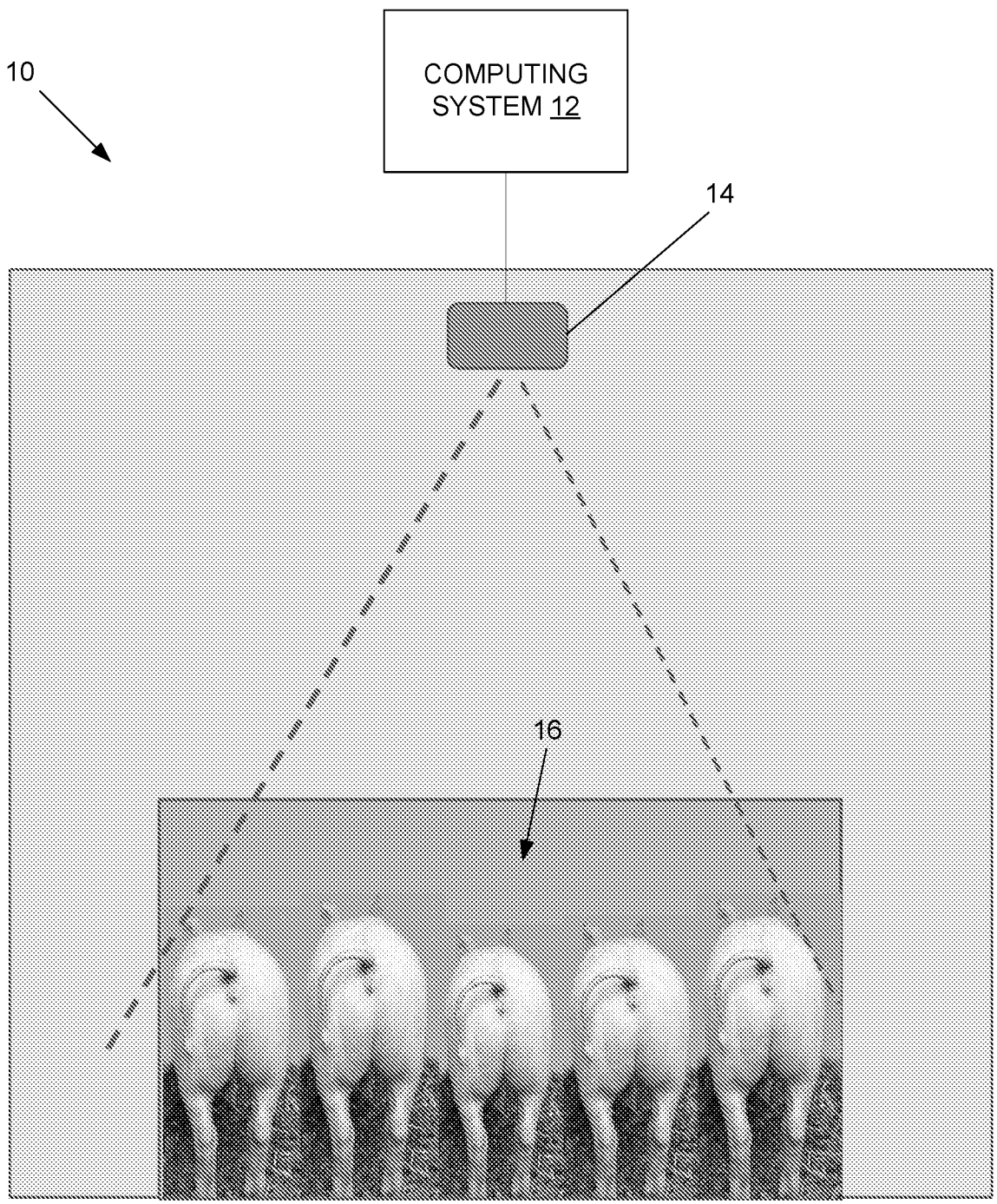
FIG. 1 is a schematic diagram that illustrates an example image acquisition arrangement for an embodiment of an animal weight estimation system.

In one embodiment, a method executed by a computing system, comprising: receiving pixel samples from three-dimensional (3D) data corresponding to one or more images comprising one or more animals; fitting curves for the received pixel samples; deriving parameters from the curves; determining measurements based on variations in the parameters; and estimating a weight of the one or more animals by applying one or more regression algorithms to the measurements.

DETAILED DESCRIPTION

Certain embodiments of an animal weight estimation system and method are disclosed that estimate a weight of one or more animals using imaging techniques that gather three-dimensional (3D) data and one or more regression algorithms. In one embodiment, a 3D image of a target region for each animal is recorded, lines or slices of 3D data are extracted from the target region, curves are fitted for each of the slices, and one or more regression algorithms are performed on measures derived from variations of the parameters to estimate the weight.

Digressing briefly, and as explained in the background of the present disclosure, various conventional techniques are used to estimate weight in the livestock industry. Weight scales, for instance, are used, but are costly given the weight of certain livestock and present challenges in routing the animals to the scales. Imaging techniques also exist, but some use two-dimensional (2D) imaging data that establish a contour from which analysis is performed, which generally provides less information than 3D data and limits the camera point of view from which images can be acquired. For instance, when using the contour of an image for measurements, the camera should be exactly above the animal or else the contour will not contain the needed information (e.g., hip shape, etc.). Further, some systems that use 3D imaging require the generation of models and comparison thereof with the acquired images. In contrast, certain embodiments of an animal weight estimation system do not determine measures based on the contour (though may use the contour to limit the sampling range), nor is there a need to generate or work with 3D models. Rather, by analyzing the surface and performing curve fitting, certain embodiments of an animal weight estimation system can work with an image that has been recorded with an angle. The parts of the animal that are not seen from an angle do not matter as much in a 3D image since it only reduced the number of samples used of the curve fitting. For instance, the width of the animal can only be measured based on 2D imaging if both sides of the animal are seen. The 3D imaging of certain embodiments of an animal weight estimation system also enables the measurement of a plurality of animals concurrently since there is no need for the animals to be directly beneath the camera. Certain embodiments of an animal weight estimation system further apply regression algorithms from measurements derived from curves corresponding to a target region of the animal (and not from actual measurements of the animal), circumventing the need for comparison with a model.

Having summarized certain features of an animal weight estimation system of the present disclosure, reference will now be made in detail to the description of an animal weight estimation system as illustrated in the drawings. While an animal weight estimation system will be described in connection with these drawings, there is no intent to limit it to the embodiment or embodiments disclosed herein. For instance, though emphasis is placed on an application to a pig and target regions for slices that are suited to the anatomy of a pig, it should be appreciated that certain embodiments of an animal weight estimation system may be beneficially deployed for weight estimations of other animals as modified to suit the anatomical structure of the chosen animal. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the principles and scope of the disclosure as defined by the appended claims. Further, it should be appreciated in the context of the present disclosure that the claims are not necessarily limited to the particular embodiments set out in the description.

Reference is made to FIG. 1, which schematically illustrates an example image acquisition arrangement 10 for an embodiment of an animal weight estimation system. As depicted in this example, the image acquisition arrangement 10 comprises a computing system 12 and an image acquisition system 14 wired or wirelessly coupled to the computing system 12. In one embodiment, the computing system 12 is co-located with the image acquisition system 14. In some embodiments, the computing system 12 is remote from the image acquisition system 14, wherein the computing system 12 is connected via a wired and/or wireless network (e.g., wide area network, local area network, telephony network, etc.) to the image acquisition system 14 to enable data to be exchanged between the image acquisition system 14 and the computing system 12. The image acquisition system 14 may comprise a single three-dimensional (3D) camera (e.g., 3D time of flight, or TOF, camera, or a stereoscopic, non-TOF camera), or multiple, separate two-dimensional (2D) cameras offset from one another to provide a stereoscopic or 3D image data output (e.g., in some embodiments, the computing system 12 may receive the respective 2D data image outputs and process the images to provide a 3D result). For instance, the 3D TOF camera or the stereoscopic camera provides a 3D image with each pixel having x, y, z information. In some embodiments, the image acquisition system 14 may comprise a 2D camera and a TOF device (e.g., range finder) to collectively provide a 3D image output (e.g., the TOF device providing one dimension, such as the height). The TOF device may be a radar or lidar-based device. In some embodiments, functionality of the computing system 12 may be integrated within the image acquisition system 14, or vice versa.

As one example illustration, assume the image acquisition system 14 is configured as a 320×240 3D TOF camera (hereinafter, referred to as a 3D TOF camera 14), with the understanding that non-TOF cameras or cameras of a different resolution may be used in some embodiments. The 3D TOF camera 14 captures (records) an image that includes one or more animals 16. In the depicted example, the animals 16 are pigs, but it should be appreciated by one having ordinary skill in the art that the animals may include other livestock (e.g., cattle, chickens, etc.) or non-farm or non-livestock types of animals (e.g., humans, wildlife, domestic pets, etc.). From the recorded image, information is acquired that includes the exact distance from the 3D TOF camera 14 of every point of each pig 16. That is, the depth information provided by the 3D TOF camera 14 enables the computing system 12 to compute the exact physical location, in real units (e.g., centimeters, decimeters, meters, etc.) in a 3D space, using every surface pixel. Digressing briefly, when relying solely on a 2D image, only the contour of an object defines an object completely, compared to a 3D image where every pixel of the surface of an object contains valuable information. As an illustrative example, a 60×30 rectangular object recorded by a 320×240 3D camera has 1800 valuable pixels, whereas the same rectangular object recorded by a 1280×960 2D camera captures a 240×120 object with 720 valuable pixels (e.g., 2×240+2×120). By taking advantage of the extra information provided for each pixel of the 3D TOF camera 14, good measurements with a lower resolution image may be acquired, which enables processing power of the processor of the computing system 12 and/or the 3D TOF camera 14 to be sensibly lowered.

Calibration of the pixels of the 3D image from the 3D TOF camera 14 may be performed once (in production), and is completely determined by the lens properties (e.g., intrinsic and distortion parameters) and the speed of light, both of which are constant. Explaining calibration further, an object may measure twenty (20) pixels at one point and forty (40) pixels at another point, and the calibration provides a mechanism to relate the pixels to real or tangible units (e.g., three dimensions, x, y, and z, in centimeters, meters, etc.). In a system using only a 2D camera for image recordings, calibration of pixels is only possible for a particular plane (e.g., if a contour measured by the 2D camera is not all in the same plane, the result is not accurate).

In one embodiment, the light source of the 3D TOF camera 14 is at a wavelength of 850 nanometers (nm) and is not visible (i.e., the infrared or IR spectrum). In some embodiments, other wavelengths of the invisible or visible spectrum may be used. One benefit to using an invisible light source is that the pig 16 cannot see the light, and hence there is no interference or disruption with pig activity.

In the arrangement 10 depicted in FIG. 1, the 3D TOF camera 14 is arranged above the pigs 16, preferably out of way of employee activity (e.g., approximately 2-3 meters above the ground). On-site calibration is preferably limited, requiring no intervention or specials skills from the installer. Indeed, possible errors in the installation may be accounted for in the on-site calibration. In one embodiment, the calibration on-site is a self-calibration, where the computing system 12 and/or the 3D TOF camera 14 calculate (and record) a tilt of the 3D TOF camera 14 and record 3D images of the floor and surrounding objects, including the floor. For instance, such measurements and 3D image recordings enable a computation of the distance between each pixel in the image and the 3D TOF camera 14. Using the floor as a reference (or in some embodiments, using other reference points), a computation of a respective height of the pigs 16 is enabled.

In operation, the computing system 12 and the 3D TOF camera 14 continually (e.g., for each recorded image) extract and track all properly positioned (e.g., standing) pigs 16 viewed by the 3D TOF camera 14. In some embodiments, recording and tracking may be performed according to predefined or event driven intervals, the frequency and/or duration of which may be user-configured or preset. The extraction of the pigs 16 in each image is simplified by the depth information where the value of each pixel comprises the height, which is more reliable than extractions performed by image analysis based on lighting, where the value of each pixel is the intensity of the reflected light. In other words, having information at each pixel provides an image that is easier for segmentation algorithms than relying on the intensity of the reflected light for segmentation. For each pig 16, one or more parameters are derived from successive frames of the imaged pig(s) 16 and measurements from variations of the parameters are taken and averaged (or in some embodiments, other and/or statistical computations are performed) to increase accuracy.

Figure 2B:
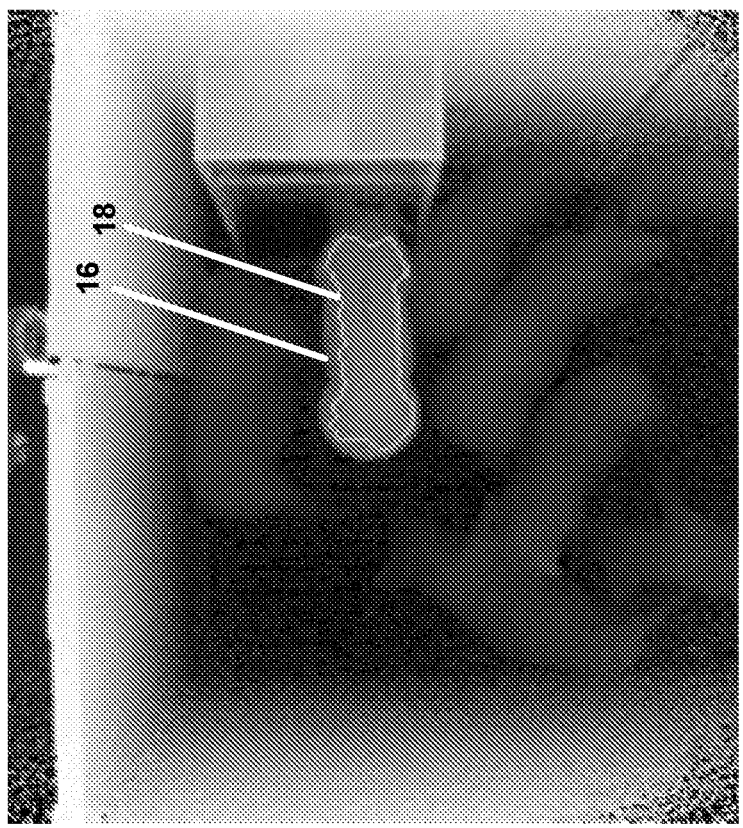
FIGS. 2A and 2B are schematic diagrams that illustrate example image processing for an embodiment of an animal weight estimation system.
Figure 2A:
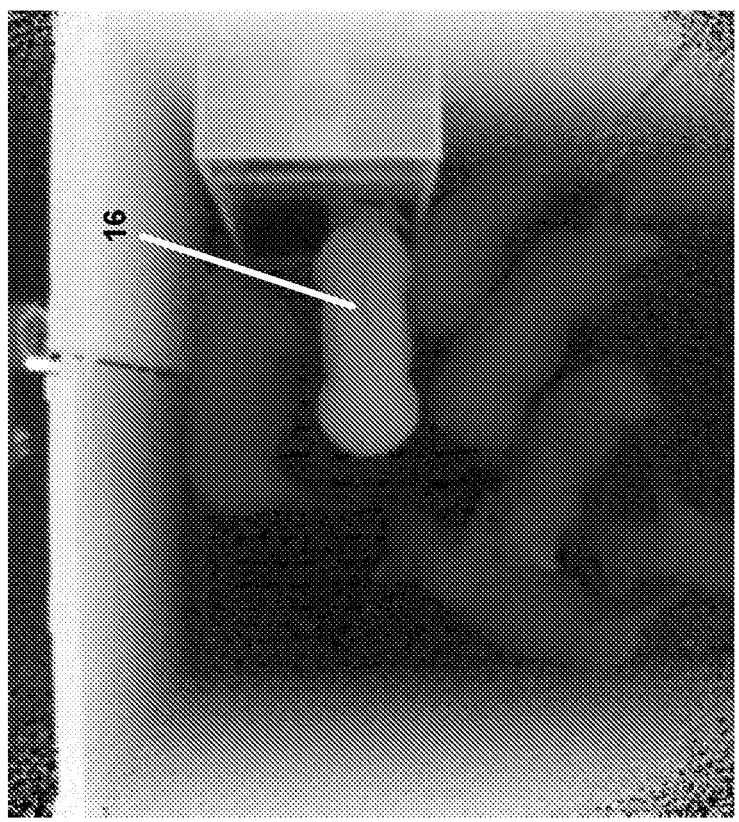

Referring now to FIGS. 2A-2B, shown are schematic diagrams that illustrate example image processing for an embodiment of an animal weight estimation system. Directing attention to FIG. 2A, shown is a view (overhead) from the 3D TOF camera 14 where one of the pigs 16 is highlighted (e.g., visually distinguished) to illustrate segmentation. That is, the computing system 12 uses the known image processing technique of segmentation to identify all pixels belonging to each pig 16. Segmentation generally refers to extracting pixels and associating each pixel with an object of interest (e.g., the pig 16), and in general, is used in conjunction with edge detection techniques (e.g., watershed, etc.). Note that segmentation is performed concurrently for all pigs 16 in the recorded image, enabling identification of each of the pigs 16 at one time. As indicated above, plural successive images are taken, and hence some pigs 16 may be partially within view, some may leave the view and others may enter the view. The computing system 12 tracks each pig 16 from one frame to the other, enabling association of 3D data for each pig 16 throughout successive frames. Where the pig is completely within view and standing, the computing system 12 derives measurements for estimation of the pig weight. In one embodiment, measurements are recorded in a continual (non-stop) manner, and may be time-stamped. In terms of processing, data may be stored in one or more data structures (e.g., database(s)), and accessed and grouped to enable the computing system 12 to perform statistical analysis on the data. For instance, variations of pig weight in relation to time (e.g., using a 24-hour day as a unit of time, though not limited to this time increment) may be of interest. Further, by monitoring the frequency at which a pig 16 has been measured during a time interval, the inverse of that frequency may be used as a statistical weight to obtain a weighted average for each interval of time, which prevents the average from being skewed by some pigs 16 being over-represented. For instance, with the image acquisition system 14 installed close to a feeder, large pigs 16 may be recorded going beneath the image acquisition system 14 more often than smaller pigs 16, which may skew the average towards a larger weight. Note that in some embodiments, the image acquisition system 14 and computing system 12 may record images on a periodic or aperiodic (e.g., event driven or random) basis. Although the current embodiment does not indicate whether a pig 16 that is no longer within the image is the same as one re-entering at a later time in the day, one goal is to achieve estimation of average weights and hence such repeated analysis is of little or no consequence. However, in some embodiments, other and/or additional mechanisms of identification and tracking may be used, such as detection of a particular identifier associated with each pig (e.g., having a radio frequency identifier (RFID) attached thereto, detection of artificial markings (e.g., painted numbers), etc.), which may prevent measuring the same animal twice in the same monitoring period (e.g., same day).

Turning to FIG. 2B, the computing system 12 (FIG. 1), after identifying all pixels belong to the pig 16 (actually all pigs 16 that are standing, but using one pig 16 as an example), the computing system 12 computes a geometric shape 18 (e.g., substantially rectangular, though other shapes may be used in some embodiments) that is oriented with the pig 16 (e.g., along the axis of inertia of the pig 16) for a target region (e.g., in this case, the back of the pig 16 between the shoulder and hip). The geometric shape 18 serves as a boundary or contour area to limit the sampling of pixels to within the geometric shape 18.

Figure 3:
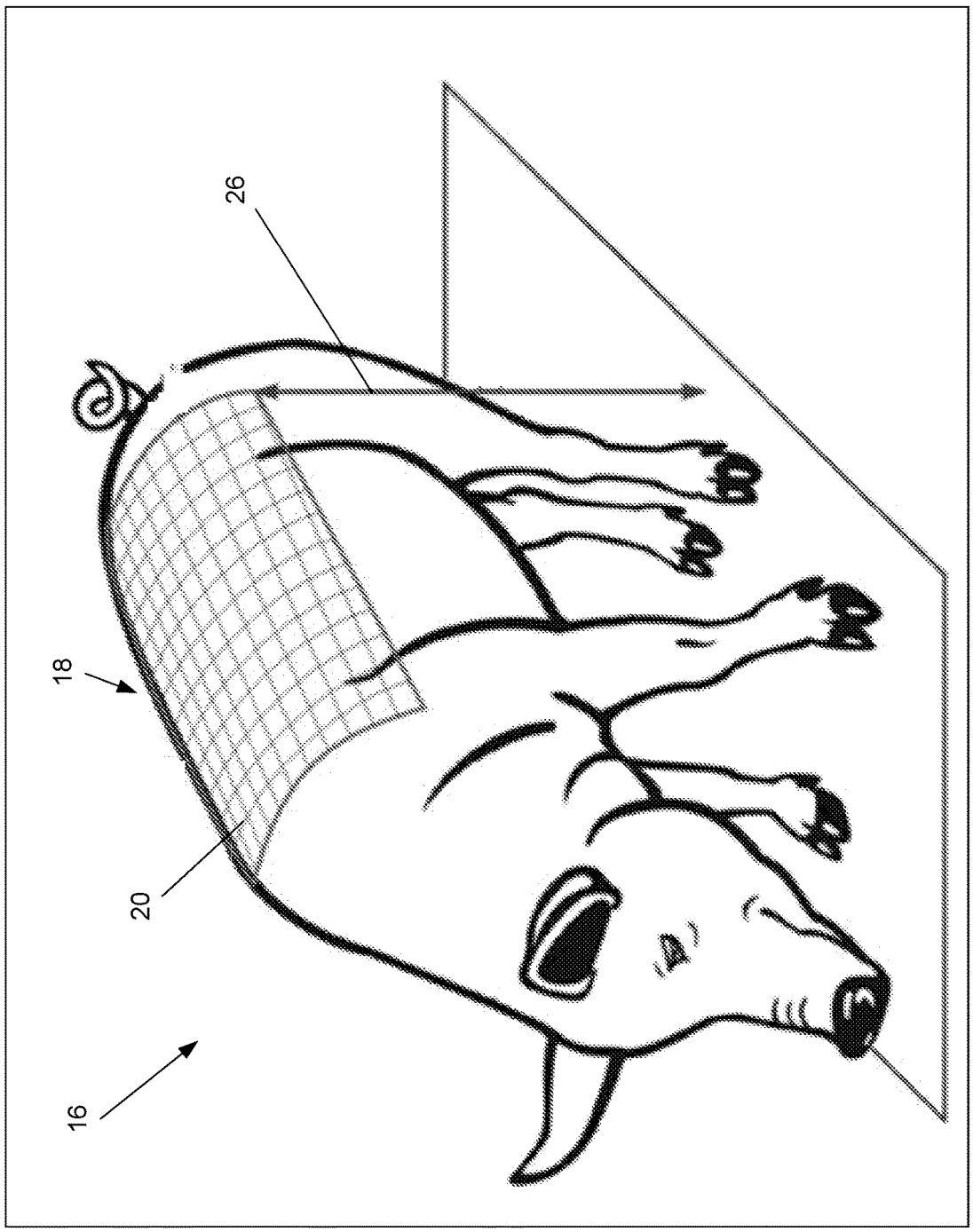
FIG. 3 is a schematic diagram that illustrates 3D pixel sample extraction for an embodiment of an animal weight estimation system.

Attention is now directed to FIG. 3, which illustrates 3D pixel sample extraction for an embodiment of an animal weight estimation system. As described above, the computing system 12 (FIG. 1) computes a geometric shape 18 that is oriented with the pig 16 to constrain the sampling to a target region (e.g., the back region). The computing system 12 extracts 3D pixel samples within the geometric shape 18 along data lines 20 (also, slices) that are perpendicular to the length of the pig 16 (e.g., perpendicular to the longitudinal data lines).

Figure 4B:
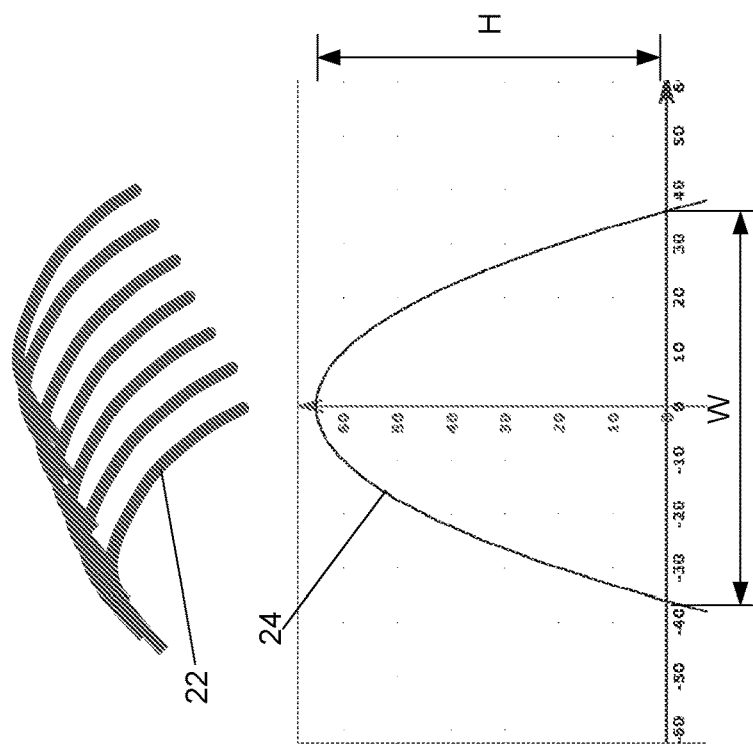
FIGS. 4A-4B are schematic diagrams that illustrate example curve fitting and parameter derivation for an embodiment of an animal weight estimation system.
Figure 4A:
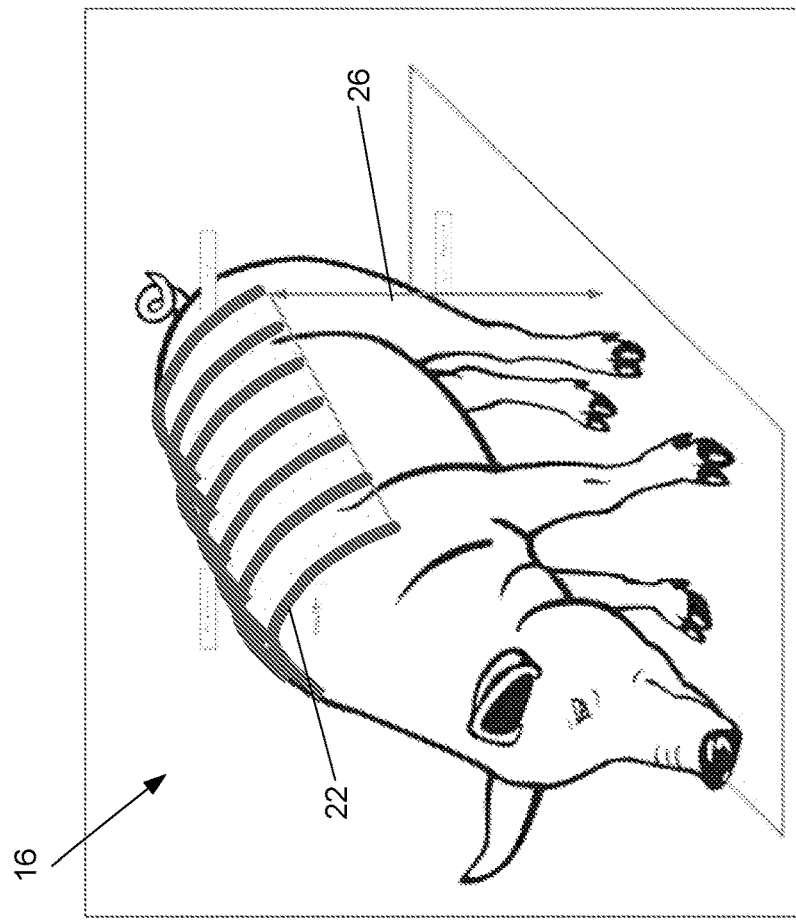

With continued reference to FIG. 3, reference is now made to FIGS. 4A-4B, which illustrate example curve fitting and parameter derivation for an embodiment of an animal weight estimation system. In one embodiment, the computing system 12 (FIG. 1) performs both a quadratic and a bi-quadratic curve fitting for each of the extracted lines or slices 20 (FIG. 3), and combines the results from the respective curve fittings to provide the example fitted curves 22 depicted in FIGS. 4A-4B. The quadratic curve fitting is less noisy and provides better results for parameters of a slice. The bi-quadratic curve fitting, on the other hand, is desirable to find, more accurately, the position of various features that depend more on the variation of the shapes of the slices, such as the position of the hip and the shoulder. The curve fitting is performed along each of the slices 20 at and above a predefined height 26 from the floor (as shown in FIGS. 3 and 4A), the curve fitting implemented from the predefined height 26 to the maximum (highest) point of the slice 20. Though the curve fitting is based on the use of a parabola 24 (FIG. 4B) in this example, curves of other types of shapes may be used in some embodiments, including curves of an elliptical or spherical shape, or generally a symmetrical shape that conforms well to the target region of interest. Explaining further, the computing system 12 performs curve fitting in a manner such that the fitted curve 22 conforms well to the target region. In this example, the parabola 24 conforms well to the slices 20 across the back of the pig 16 to a certain plane (from the top part of the pig 16 to the predefined height 26 below the top part of the pig 16), below which (e.g., the legs area) the conformity is no longer as close since the shape is significantly different. In one embodiment, the predefined height 26 comprises approximately 80%, wherein curve fitting is performed on every pixel along the slices 20 that is at and/or above approximately 80% of the maximum point of the slice 20 (e.g., 0.80×the maximum height of the slice or peak of the parabola 24). The width of the parabolic curve depicted in FIG. 4B, in one embodiment, is determined at the same or a different predefined height, for instance at approximately 85% of the height of the curve parabola in this example, though other values may be used depending on the animal and choice of curve. In some embodiments, the curve fitting may occur at and/or above other predefined heights for the determination of parameters, depending on the slice configurations (and animal body shape).

From the fitted curves 22, the computing system 12 (FIG. 1) derives parameters, and analyzes variations of the curve parameters to compute various measurements used in the estimation of pig weight. In one embodiment, the parameters include height (H) and width (W) of the fitted curves at or above the predefined height 26, as shown in FIG. 4B. In particular, the height parameter is derived from the predefined height 26 (e.g., FIG. 3 and FIG. 4A). For instance, as shown in FIG. 4B, the curve fitting process effectively fits the parabola 24 to each slice 20 (FIG. 3, and hence conforming to the back region of the pig 16), and the predefined height (e.g., approximately 80%) is used to effectively run a line between each side of the parabola 24 to truncate the "legs" of the parabola 24. Slightly above the intersection (e.g., at approximately 85%) of the transverse line and each leg of the parabola 24 is the point where a width determination is made, and which may or may not be a basis for determining the height of the curve 22 (relative to the maximum point of the slice or maximum height).

Figure 5B:
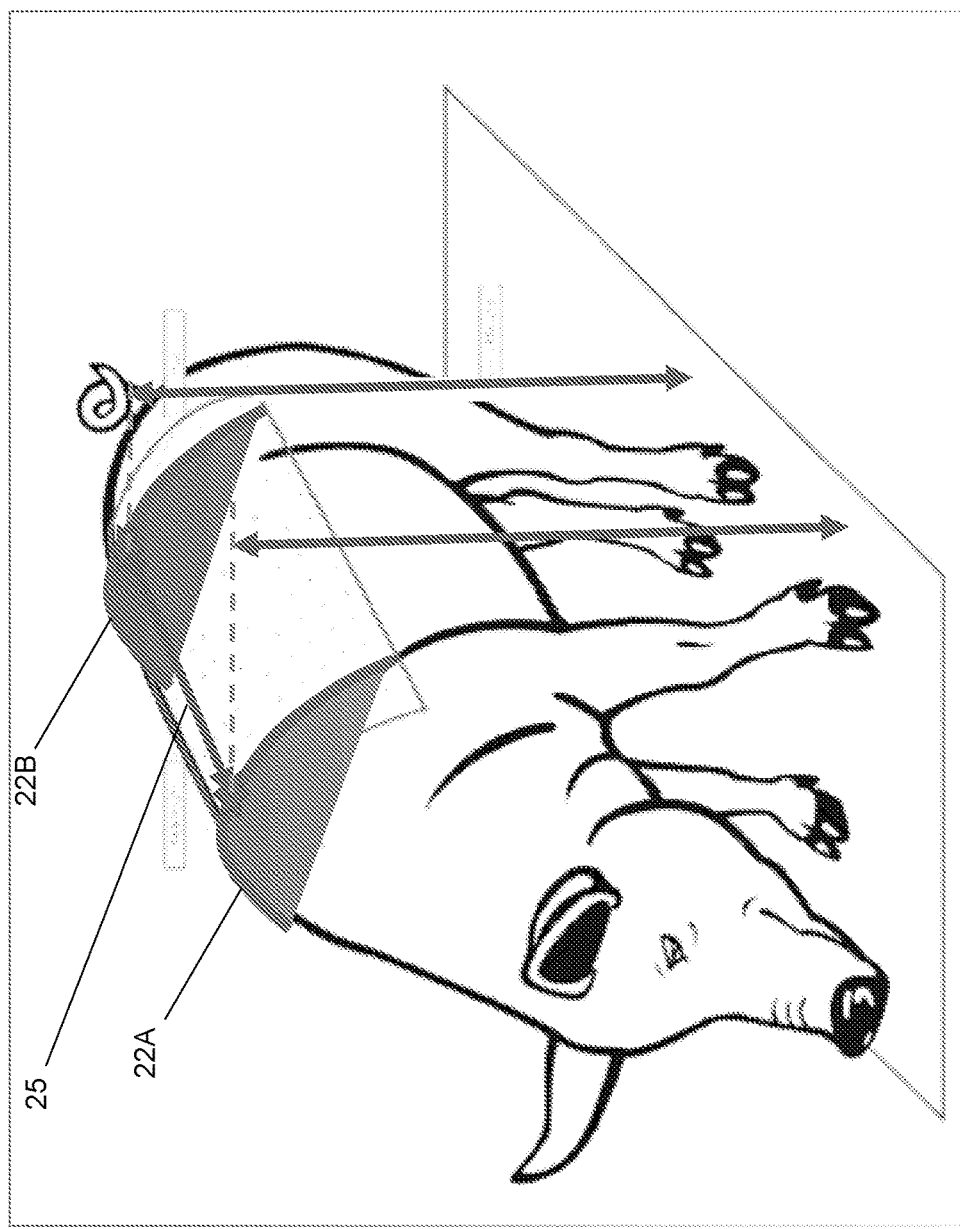
FIGS. 5A-5B are schematic diagrams that illustrate a determination of measurements based on variations in the determined parameters of FIGS. 4A-4B for an embodiment of an animal weight estimation system.
Figure 5A:
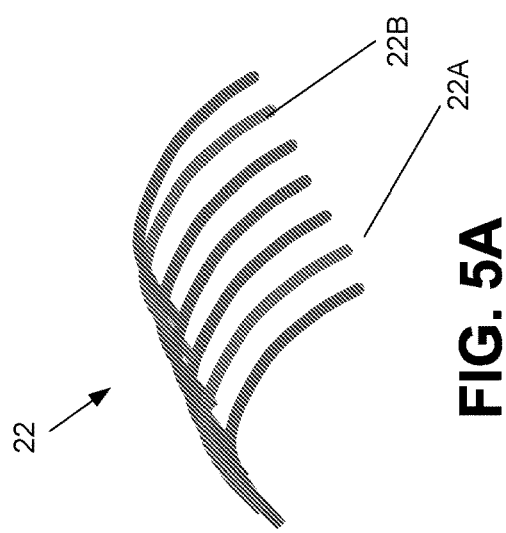

The computing system 12 (FIG. 1) analyzes variations of the derived parameters along the length of the pig 16 to determine key measurements. It is noted that the measurements are derived from the curves 22 and not directly from the pig 16, yet achieving reproducible results for the same pig 16, which enables regression algorithms to work effectively. Measurements include, by example and not limitation: width and height at the hips, length (e.g., between the hips and shoulder), width and height at the shoulders, and average width from hips to shoulders. The computing system 12 (FIG. 1) may determine additional measurements for shape factors and/or for use as elimination criteria, including average curvature of the back, straightness of the pig 16 (e.g., to check if the pig is curved sideways), and curvature from front to back (arcing of the pig 16). As to the elimination criteria, the computing system 12 eliminates any pig data corresponding to measurements that are considered bad, since bad data may corrupt the statistics corresponding to the weight estimates. In one embodiment, the computing system 12 determines bad data by computing and analyzing ratios between measurements (e.g., involving the corresponding length, width, and height and comparing to an expected or experimental range), and/or eliminating pig data where the pigs 16 are not in a proper position. FIGS. 5A and 5B illustrate an example analysis by the computing system 12 of variations in parameters to derive the key measurements. Referring to FIGS. 5A-5B, based on the analysis by the computing system 12, a determination is made that variations among the curves 22 and two of the fitted curves 22A, 22B are prominent, and provide a basis for one example length measurement 25. For instance, the curve widths vary along the length of the pig 16, with the maximum widths determined to be along fitted curves 22A and 22B corresponding to the shoulder and hip areas, respectively, of the pig 16. The maximum widths in this example are used to establish a length measurement 25. Depending on the animal, different datum points may be used for the length. Measurements are accumulated for each tracked pig 16 and averaged by the computing system 12 to enable precision in weight estimates.

Figure 6:
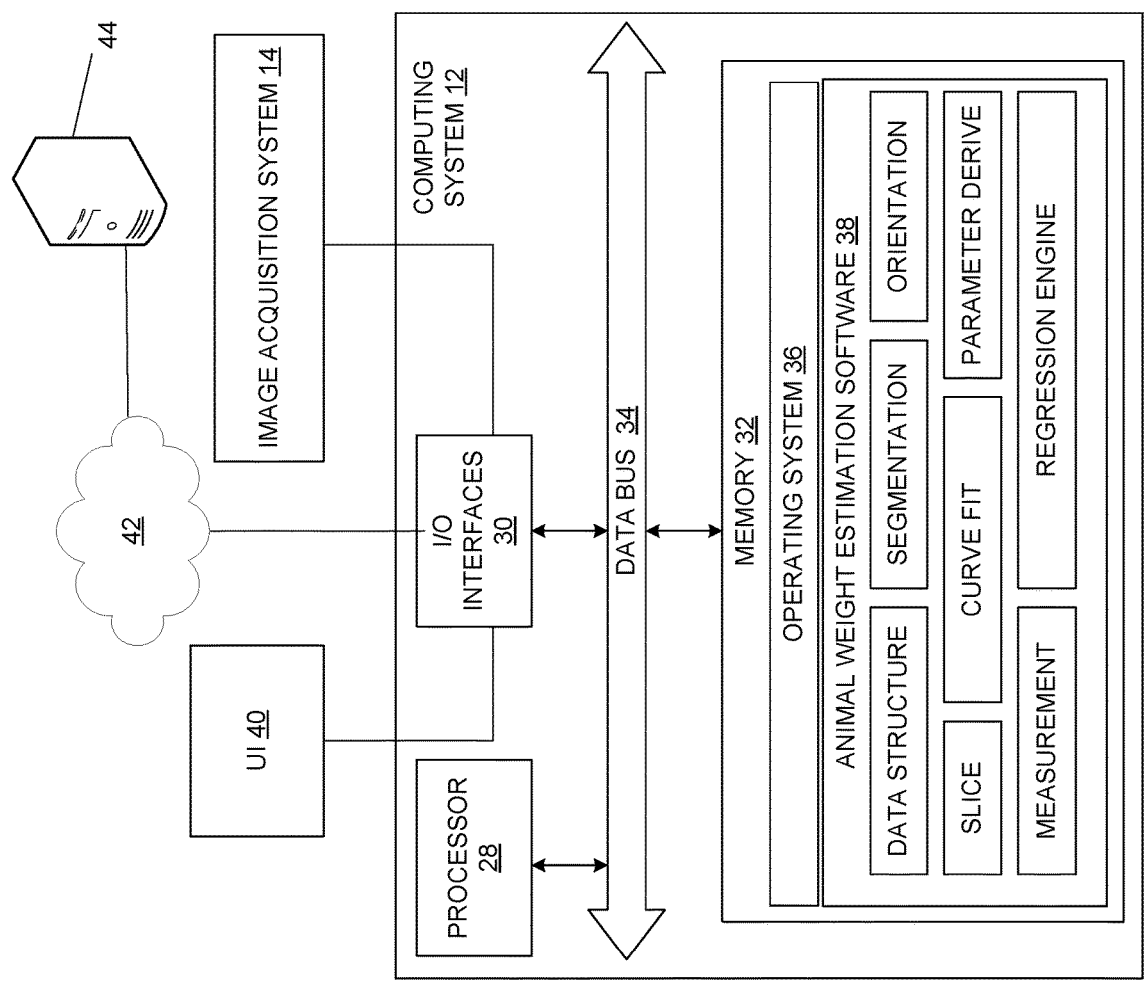
FIG. 6 is a schematic diagram that illustrates an embodiment of an example computing system for an embodiment of an animal weight estimation system.

Attention is now directed to FIG. 6, which illustrates an embodiment of the example computing system 12 for an embodiment of an animal weight estimation system. Note that in one embodiment, the animal weight estimation system may comprise all or a portion of the computing system 12, or a combination of all or a portion of the computing system 12 and the image acquisition system 14 (e.g., 3D TOF camera, stereoscopic camera, etc.). In some embodiments, the animal weight estimation system may comprise additional components. One having ordinary skill in the art should appreciate in the context of the present disclosure that the computing system 12 is illustrative of one example, and that some embodiments of computing systems may comprise fewer or additional components, and/or some of the functionality associated with the various components depicted in FIG. 6 may be combined, or further distributed among additional modules and/or computing devices, in some embodiments. It should be appreciated that, though described in the context of being co-located with the image acquisition system 14, in some embodiments, as indicated above, the computing system 12 (or all or a part of the functionality of the computing system 12) may be located elsewhere (e.g., remotely) relative to the image acquisition system 14 yet in communication therewith (e.g., via telephony and/or a network, including via the Internet). The computing system 12 is depicted in this example as a computer device, but may be embodied as a programmable logic controller (PLC), field programmable gate array (FPGA), application-specific integrated circuit (ASIC), among other devices. In some embodiments, the computing system 12 may comprise two or more devices. In some embodiments, functionality of the computing system 12 may be integrated within the image acquisition system 14 (or vice versa). It should be appreciated that certain well-known components of computer systems are omitted here to avoid obfuscating relevant features of the computing system 12.

In one embodiment, the computing system 12 comprises one or more processors, such as processor 28, input/output (I/O) interface(s) 30, and memory 32, all coupled to one or more data busses, such as data bus 34. The memory 32 may include any one or a combination of volatile memory elements (e.g., random-access memory RAM, such as DRAM, and SRAM, etc.) and nonvolatile memory elements (e.g., ROM, Flash, hard drive, EPROM, EEPROM, CDROM, etc.). The memory 32 may store a native operating system, one or more native applications, emulation systems, or emulated applications for any of a variety of operating systems and/or emulated hardware platforms, emulated operating systems, etc. In the embodiment depicted in FIG. 6, the memory 32 comprises an operating system 36 and animal weight estimation software 38, which in one embodiment comprises a data structure, and one or more modules pertaining to functionality described above, including code or instructions for segmentation, orientation (for establishing a target region), slicing (slice), curve fitting (curve fit), parameter derivation (parameter derive), key measurements (e.g., measurement, based on variations in the parameters), and further including a regression engine for executing one or more regression algorithms, the regression engine described further below. In some embodiments, the animal weight estimation software 38 may comprise additional components or modules, including graphical user interface (GUI) software that presents visual feedback (or enables an interactive interface that provides an opportunity for user intervention) of imaging, weight estimates, and other information about the pig weight processing and/or imaging mechanisms. Other additional modules may include browser software, or if located remotely, web-host network software, communications software, etc., or in some embodiments, fewer software modules (e.g., combined functionality, omitted functionality) may be employed (or omitted) in the memory 32 or used in additional memory. In some embodiments, a separate storage device may be coupled to the data bus 34 or accessed from locations in a network that enable such access by the computing system 12 via the I/O interfaces 30, such as a persistent memory (e.g., optical, magnetic, and/or semiconductor memory and associated drives).

The computing system 12 is further coupled via the I/O interfaces 30 to a user interface (UI) 40 and the image acquisition system 14. In some embodiments, as described above, the computing system 12 may be in communication via a network 42 (e.g., one or a combination of a wide area network, local area network, personal area network, wireless carrier and/or telephony network, cable networks, satellite network, etc.) with one or more other computing devices, such as server device 44. For instance, one or more functionality of the animal weight estimation software 38 may be distributed among the computing system 12 and the server device 44.

The animal weight estimation software 38 comprises executable code (instructions) that receives 3D data and uses derivations from the 3D data to estimate animal weights.

Most of the functionality of the corresponding modules of the animal weight estimation software 38 has been described above, though a brief summary description of each follows. The data structure may store recorded images for subsequent processing (e.g., segmentation, orientation, etc.). The segmentation module provides for the identification of all pixels belonging to each animal. The orientation module enables the computation of a geometric shape (e.g., somewhat rectangular or other shapes) that is oriented with the axis of inertia of the animal, providing for a boundary or target region for which sampling of 3D pixels is performed. The slice module performs the extraction of 3D pixel samples along lines or slices that are arranged perpendicular to the length of the animal. The curve fit module includes, in one embodiment, quadratic and bi-quadratic curve fitting functionality for each of the extracted slices. Though a parabolic shape was illustrated in association with the example embodiments described above, other shapes and/or curve fitting equations may be used that best conform to a target region of the animal. The parameter derive module derives parameters (e.g., width, height) of the fitted curves at predefined heights (e.g., approximately 80% of height, approximately 85% for width) of the fitted curves. In some embodiments, the predefined heights may be pre-programmed, and in some embodiments, the predefined heights may be user-configured. The measurement module is used to analyze variations in the parameters along the length of the animal to derive key measurements.

As to the regression engine (also referred to as a regression module), the animal weight estimation software 38 evaluates the animal's weight (e.g., pig weight) by using one or more regression algorithms of the regression engine. The regression algorithms have been created based on historical data comprising a large number of actual pig weights that were taken mechanically (e.g., using a mechanical scale) and associated with 3D images of a multitude of pigs of all sizes and shapes. That is, as is true generally in principle for regression algorithms, in a learning phase, measurement data and a real target result (e.g., real weight of each pig) for a multitude of subjects (e.g., pigs) is used to build the regression engine. When the regression engine is used, the regression engine receives inputs and estimates the target result. At least one of the regression algorithms (e.g., linear regression) of the regression engine comprises an equation with regression parameters that define the regression applied to the inputted data and that are based on the historical pig data (e.g., from the learning phase). At least another regression algorithm of the regression engine comprises a machine learning algorithm (e.g., XGBoost, neural network, random forest, etc.), which in one embodiment uses a tree ensemble (e.g., plurality of trees) and combines the results of all of the trees. In neural network embodiments, the regression parameters may be weights of the sum of connected nodes for every node for every layer. Accordingly, unlike a model-based approach, certain embodiments of an animal weight estimation system do not need to access a model for comparison with the monitored pig data, but rather, applies the regression algorithms to the measurement data. In one embodiment, the regression engine, as executed by the processor 28, executes plural (e.g., two) stages of regression algorithms to evaluate the pig weight. In a first stage, the regression module derives a simple volume by multiplying the following example measurements:

$$\text{Volume} = \text{hip to shoulder length} \times \text{average width} \times \text{hip height} \quad \text{(Eqn1)}$$

Note that in some embodiments, the volume may be determined from other measurements. The regression engine, consisting of a highly correlated linear equation between the weight of the pig and the derived volume, performs an evaluation of the weight using the derived volume from Eqn1. Note that in some embodiments, the first regression may suffice for purposes of accuracy in estimating the pig weight.

In a second stage, the regression engine scales all the measurements. In one embodiment, the regression engine scales the measurements by taking a cubic root of the volume of Eqn1. By taking the cubic root of the volume, which has a dimensional value of three, one dimensional values are obtained, which then can be used to scale other values that have a dimension of one and/or used to scale a curvature. By scaling all derived measurements (e.g., hip to shoulder length, average width, hip height, hip width, shoulder width, shoulder height, back curvature, etc.), each scaled measurement is used as a shape factor. The regression engine obtains shape factors that are independent of the size of the pigs. In other words, by scaling, the same shape factors can be used, for instance, for an eighty (80) lbs. pig or three-hundred (300) lbs. pig, since the effect on the weight estimation correction factor is the same. As an illustrative example, two pigs that have the same volume may have a different weight due to differences in shape. For instance, one pig may have larger hips, while another pig may have a more elongated shape. The shape factors should be scaled (normalized) to obtain a correction factor that may be applied to the estimated weight to more closely approximate the real weight. The regression engine, as indicated above, uses a more sophisticated regression algorithm (e.g., a learning algorithm, including decision trees, random forest, gradient boost-based learning algorithms, etc.) for the second stage that associates the scaled measurements to a ratio of the evaluated weight-to-real weight. In other words, the second regression stage is based on the pig shape, and produces a ratio that is applied to the evaluation of the pig weight from the first stage to derive an estimated pig weight. The use of the second regression stage provides for improved precision by considering the shape of the pig. To recap the stages of regression according to at least one embodiment, the first stage uses the derived volume as an input to output as its target a first weight estimation, the second stage uses as input scaled derived measurements to output as its target an estimated ratio of the first weight estimation/real weight, and a final estimation equals the first stage estimation×the second stage estimated ratio.

Note that two or more of the aforementioned modules of the animal weight estimation software 38 may be combined, distributed among one or more additional devices, or reside elsewhere (e.g., in the server device 44), which may have a similar architecture to that described in association with the computing system 12 of FIG. 6.

Execution of the animal weight estimation software 38 (and associated modules) may be implemented by the processor 28 under the management and/or control of the operating system 36. The processor 28 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing system 12.

The I/O interfaces 30 provide one or more interfaces to communicatively coupled (wireless or wired) devices, including access to one or more devices coupled to one or more networks 42 and/or to the computing system 12. In other words, the I/O interfaces 30 may comprise any number of interfaces for the input and output of signals (e.g., comprising analog or digital data) for receipt or conveyance of information (e.g., data) over one or more networks. The I/O interfaces 30 may include communication functionality, including a radio or cellular modem or other communication functionality utilizing Bluetooth, 802.11, near field communications (NFC), or wired protocol mechanisms (e.g., FTP, HTTP, MPEG, AVC, DSL, ADSL, etc., or derivatives or variants thereof).

The user interface (UI) 40 may include one or any combination of a keyboard, joystick (e.g., with tactile motor), headset, mouse, microphone, display screen, touch-type or otherwise, among other types of input devices. In some embodiments, the user interface 40 may be omitted.

When certain embodiments of the computing system 12 are implemented at least in part as software (including firmware), as depicted in FIG. 6, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computing system 12 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
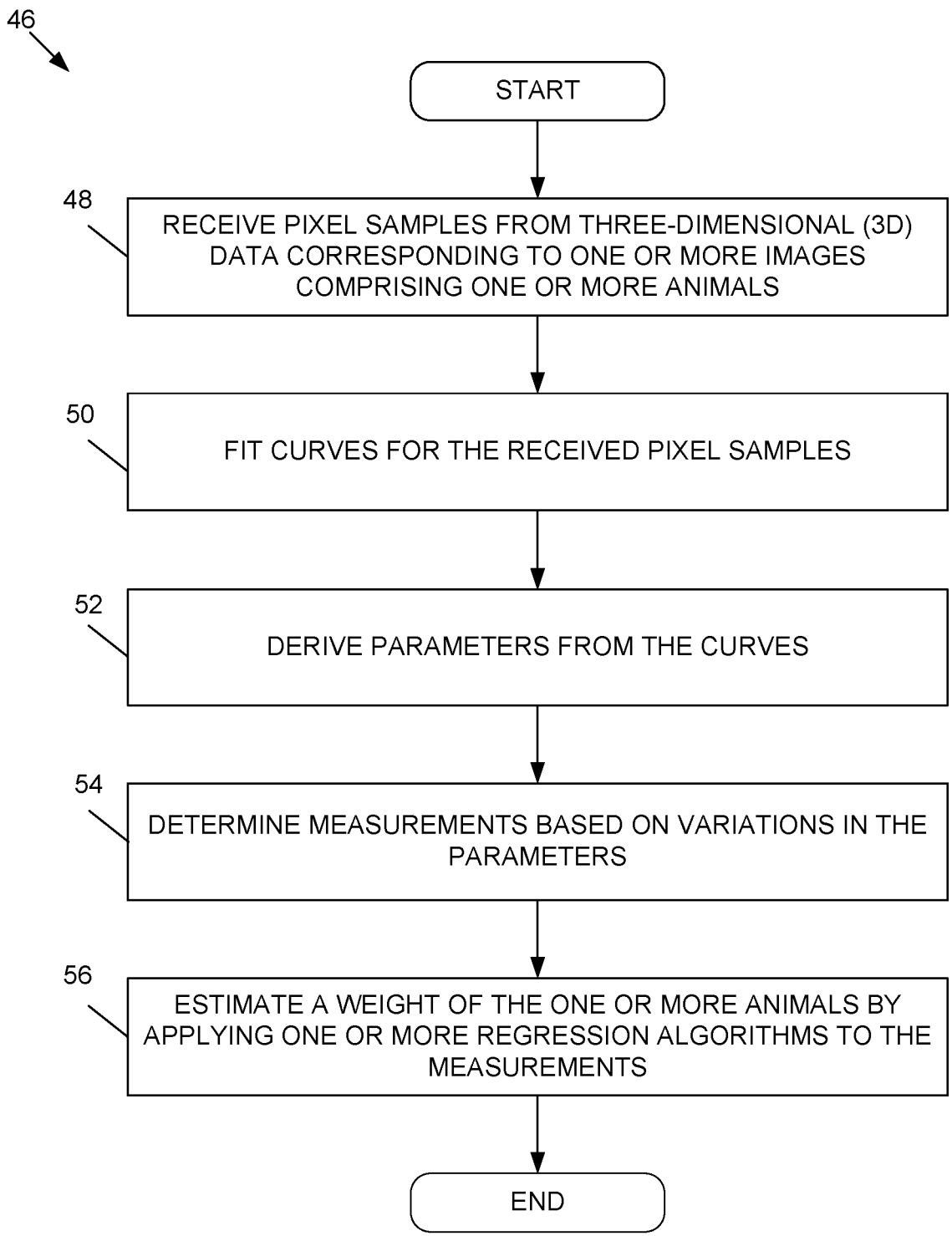
FIG. 7 is a flow diagram that illustrates an embodiment of an example animal weight estimation method.

In view of the above description, it should be appreciated that one embodiment of an animal weight estimation method, depicted in FIG. 7, denoted as method 46, and executed by a computing system, comprises: receiving pixel samples from three-dimensional (3D) data corresponding to one or more images comprising one or more animals (48); fitting curves for the received pixel samples (50); deriving parameters from the curves (52); determining measurements based on variations in the parameters (54); and estimating a weight of the one or more animals by applying one or more regression algorithms to the measurements (56).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the systems and methods have been described with reference to the example embodiments illustrated in the attached figures, it is noted that equivalents may be employed and substitutions made herein without departing from the scope of the disclosure as protected by the following claims.

At least the following is claimed:

1. A system, comprising:
an image acquisition system configured to record three-dimensional (3D) data of images that comprises one or more animals; and
a computing system configured to, for each of the recorded images:
receive pixel samples from the 3D data corresponding to the image of the one or more animals;
fit curves for the received pixel samples;
derive parameters from the curves;
determine measurements based on variations in the parameters; and
estimate a weight of the one or more animals by applying one or more regression algorithms to the measurements.

2. The system of claim 1, wherein the computing system is further configured to combine the estimates for each of the recorded images.

3. The system of claim 2, wherein combining comprises averaging.

4. The system of claim 1, wherein the computing system is further configured to identify the one or more animals by segmenting plural pixels of the recorded 3D data of each image before receiving the pixel samples.

5. The system of claim 1, wherein the computing system is further configured to:
calculate a geometric shape that is oriented along an axis of inertia of the one or more imaged animals; and
receive the pixel samples along slices of the imaged animal that are arranged perpendicular to the axis and taken along the length of the imaged animal.

6. The system of claim 5, wherein the computing system is further configured to fit the curves by performing a quadratic and bi-quadratic curve fitting for each of the slices.

7. The system of claim 5, wherein the computing system is further configured to fit the curves based on starting and ending the curve fitting at a predefined percentage of a maximum point of each of the slices.

8. The system of claim 1, wherein the computing system is further configured to receive the pixel samples by extracting 3D pixel samples along a length of a target region of the one or more animals, the target region similarly shaped to the curves used in the curve fitting.

9. The system of claim 1, wherein the parameters comprise height and width of the curves, and wherein the computing system is further configured to derive the height and width at one or more predefined heights of the fitted curves.

10. The system of claim 9, wherein the measurements comprise any one or a combination of: width and height at hips of the one or more animals, width and height at a shoulder of the one or more animals, length between the shoulder and hip of the one or more animals, or average width from hip to shoulder of the one or more animals.

11. The system of claim 10, wherein the measurements further comprise additional measurements, wherein the additional measurements comprise any one or a combination of: an average curvature of a back region, straightness of the back region, or curvature from front to back of the one or more animals, wherein the computing system is further configured to derive shape factors based on the additional measurements, use the additional measurements as elimination criteria to eliminate data corresponding to the one or more animals, or derive the shape factors based on the additional measurements and use the additional measurements as the elimination criteria.

12. The system of claim 1, wherein the computing system is further configured to estimate the weight by applying at least a first regression algorithm to the measurements and a second regression algorithm to a scaled version of the measurements, the second regression algorithm different than the first regression algorithm, the second regression algorithm based on a learning regression algorithm.

13. The system of claim 12, wherein the computing system is configured to apply the first regression algorithm to the measurements by:
deriving a volume of the one or more animals based on the measurements; and
performing a linear regression between the derived volume and animal weight.

14. The system of claim 13, wherein the computing system is configured to apply the second regression algorithm to the scaled measurements by:
scaling the measurements; and
use the scaled measurements to estimate the ratio of the first weight estimation of the one or more animals to a real weight.

15. The system of claim 14, wherein the computing system is configured to scale the measurements by computing a cubic root of the volume.

16. The system of claim 14, wherein the computing system is configured to estimate the weight by applying the ratio to the weight estimated from the first regression algorithm.

17. The system of claim 1, wherein the image acquisition system is configured to operate in a non-visible electromagnetic wavelength spectrum.

18. The system of claim 1, wherein the image acquisition system comprises one of a time of flight 3D camera, a stereoscopic camera, a plurality of cameras, or a camera and a range finder.

19. A method executed by a computing system, comprising:
receiving pixel samples from three-dimensional (3D) data corresponding to one or more images comprising one or more animals;
fitting curves for the received pixel samples;
deriving parameters from the curves;
determining measurements based on variations in the parameters; and
estimating a weight of the one or more animals by applying one or more regression algorithms to the measurements.

20. A non-transitory computer readable medium encoded with instructions that cause one or more processors to:
receive pixel samples from three-dimensional (3D) data corresponding to one or more images comprising one or more animals;
fit curves for the received pixel samples;
derive parameters from the curves;
determine measurements based on variations in the parameters; and
estimate a weight of the one or more animals by applying one or more regression algorithms to the measurements.

* * * * *